US012799354B2

United States Patent
(12) United States Patent
Shi et al.

(10) Patent No.: US 12,799,354 B2
(45) Date of Patent: Nov. 17, 2026

(54) WATERBORNE UV CURABLE COATING COMPOSITION FOR ANTI-STAIN AND ANTI-SCRATCH COATINGS

(71) Applicant: Akzo Nobel Coatings International B.V., Amsterdam (NL)

(72) Inventors: Zheng Shi, Shanghai (CN); Quan James Huang, Zhejiang (CN); Hong Lin, Guangdong (CN); Puxin Fang, Zhejiang (CN)

(73) Assignee: Akzo Nobel Coatings International B.V., Amsterdam (NL)

( * ) Notice: Subject to any disclaimer, the term of this patent is extended or adjusted under 35 U.S.C. 154(b) by 1138 days.

(21) Appl. No.: 17/797,466

(22) PCT Filed: Feb. 16, 2021

(86) PCT No.: PCT/EP2021/053702
§ 371 (c)(1),
(2) Date: Aug. 4, 2022

(87) PCT Pub. No.: WO2021/165223
PCT Pub. Date: Aug. 26, 2021

(65) Prior Publication Data
US 2023/0159789 A1 May 25, 2023

(30) Foreign Application Priority Data
Mar. 26, 2020 (EP) ..................................... 20165748

(51) Int. Cl.
*C09D 175/14* (2006.01)
*C08J 3/03* (2006.01)
*C09D 133/08* (2006.01)

(52) U.S. Cl.
CPC .............. *C09D 175/14* (2013.01); *C08J 3/03* (2013.01); *C09D 133/08* (2013.01); *C08J 2333/08* (2013.01); *C08J 2375/14* (2013.01)

(58) Field of Classification Search
CPC ...... C08G 18/10; C08G 18/12; C08G 18/722; C08G 18/755; C08G 18/792; C08G 18/5015; C08G 18/5045; C08J 3/03
See application file for complete search history.

(56) References Cited

U.S. PATENT DOCUMENTS

2002/0026006 A1 2/2002 Garcia et al.
2002/0122925 A1 9/2002 Liu et al.
(Continued)

FOREIGN PATENT DOCUMENTS

CN 1320669 A 7/2001
CN 107903357 A 4/2018
(Continued)

OTHER PUBLICATIONS

English Translation of CN1320669A.
(Continued)

*Primary Examiner* — Sophie Hon
(74) *Attorney, Agent, or Firm* — Pauly, De Vries Smith & Deffner LLC

(57) ABSTRACT

The invention relates to an aqueous dispersion containing a mixture of linear fluorinated and non-fluorinated polyurethane acrylates, obtainable by: a) reacting polyisocyanate A', multi-unsaturated OH-functional compound B', acid-functional polyol C' under urethane formation reaction conditions in the presence of intermediate X, wherein intermediate X is an OH-functional (per)fluoropolyether (PFPE) derivative, and b) adding neutralizer D to the reaction product of step a) and dispersing it in water. The dispersion can be used in preparation of a coating with easy-clean,
(Continued)

(a) (b)

anti-stain and anti-scratch properties, which can advantageously be used for coating substrates in consumer electronics or automotive applications.

7 Claims, 1 Drawing Sheet

(56) References Cited

U.S. PATENT DOCUMENTS

| | | | |
|---|---|---|---|
| 2005/0249956 A1 | 11/2005 | Jing et al. | |
| 2009/0216104 A1 | 8/2009 | DeSimone et al. | |
| 2016/0304742 A1 | 10/2016 | Klang et al. | |
| 2017/0049683 A1 | 2/2017 | Klang et al. | |
| 2018/0079850 A1 | 3/2018 | Tonelli et al. | |

FOREIGN PATENT DOCUMENTS

| | | | |
|---|---|---|---|
| CN | 108424719 A | 8/2018 | |
| CN | 109054623 A | 12/2018 | |
| CN | 109293871 A | 2/2019 | |
| KR | 100775150 | 11/2007 | |
| KR | 102913970 B1 * | 1/2026 | C09D 175/16 |
| WO | 02072657 | 9/2002 | |
| WO | WO2013/017470 A1 | 2/2013 | |
| WO | 2019129692 | 7/2019 | |

OTHER PUBLICATIONS

English Translation of CN107903357A.
English Translation of CN108424719A.
English Translation of CN109054623A.
English Translation of CN109293871A.
European Search Report of Corresponding Application No. EP20165748.3, dated Sep. 25, 2020.
International Search Report and Written Opinion of Corresponding International Application No. PCT/EP2021/053702, mailed Apr. 6, 2021.
International Preliminary Report on Patentability of Corresponding International Application No. PCT/EP2021/053702, dated May 6, 2022.
"Office Action," for Korean Patent Application No. 10-2022-7031105 mailed Apr. 7, 2025 (8 pages) with English translation.

* cited by examiner

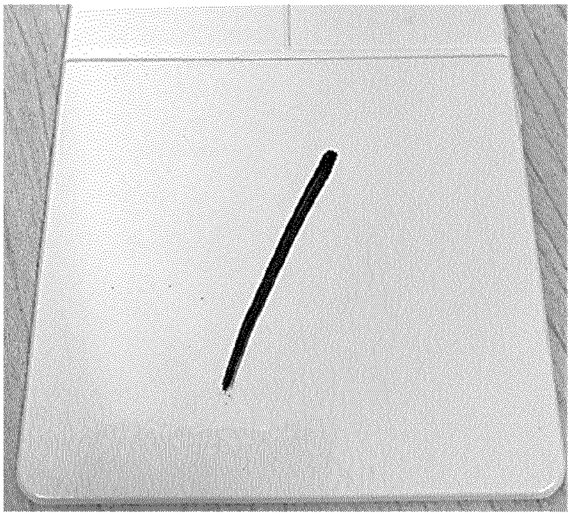
(a)
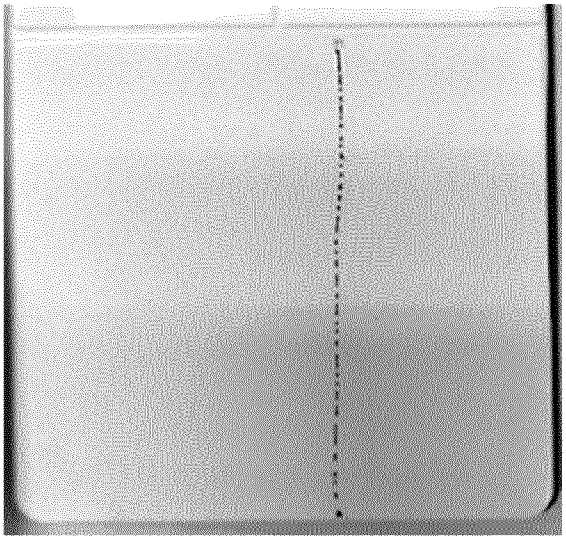
(b)

WATERBORNE UV CURABLE COATING COMPOSITION FOR ANTI-STAIN AND ANTI-SCRATCH COATINGS

CROSS-REFERENCE TO RELATED APPLICATIONS

This application is a 35 U.S.C. § 371 national phase application of PCT Application No. PCT/EP2021/053702 (published as WO 2021/165223 A1), filed on Feb. 16, 2021, which claims the benefit of priority to International Application No. PCT/CN2020/075667, filed Feb. 18, 2020 and EP application Ser. No. 20/165,748.3, filed on Mar. 26, 2020, each of which is incorporated herein by reference in its entirety.

FIELD OF THE INVENTION

The present invention relates to an aqueous dispersion useful in preparation of waterborne, UV curable coating compositions for anti-stain and anti-scratch coatings. The coatings are particularly useful in the field of consumer electronics or automotive coatings.

BACKGROUND

In the field of consumer electronic devices such as cellular phones, tablets, laptops, and automotive interiors various substrates are used, such as plastics, metal and glass. It is often desired to cover these substrates with easy-clean, stain-resistant and scratch-resistant coatings. Easy-clean means that that the surface is repellent to water, oil and/or dirt. Easy-clean coatings reduce or eliminate the need to clean the surface.

It is known in the art that fluorinated polymers, particularly, (per)fluoropolyether (PFPE), have non-stick and lubricating properties and can be used to create easy-clean and anti-stain coatings. However, such resins are only soluble in fluorinated solvents and thus difficult to use in coating formulations without the use of special solvents. The problem is even bigger when one wants to use such resins in waterborne coating compositions, since fluorinated resins typically do not disperse well in water. Consequently, the improvement of anti-stain property is often accompanied by deterioration of water dispersibility. As a result, most anti-stain coatings are typically solventborne. Another problem with PFPE-based polymers is that they typically do not have good scratch resistance.

CN109054623 describes a photo-curable polyurethane acrylate water dispersion. The polyurethane acrylate is prepared from diisocyanate, dihydromethyl propionic acid, organic fluorosilicone polyol to obtain a polyurethane prepolymer, which is then reacted with hydroxyl-containing acrylate to obtain end-capped polyurethane acrylate. To the resulting polymer an organic amine and de-ionized water are added to obtain a photo-curable polyurethane acrylate water dispersion. Coatings prepared from this dispersion have high stain-resistance and durability.

US2017049683 describes a nail polish composition based on a solvent-free aqueous polyurethane polymer dispersion, which is derived from at least one isocyanate-terminated ethylenically unsaturated polyurethane pre-polymer in a reactive diluent, after a chain extension reaction with a chain extender bearing isocyanate-reactive groups. The polyurethane pre-polymer comprises at least one (meth)acrylate functional group and at least one isocyanate functional group.

CN109293871 describes a self-leveling aqueous fluorine-containing urethane acrylic resin used in a photocurable coating. The resin is prepared from the following raw materials in mass percentage: 10-20% of trimer polyisocyanate, 10-25% of monohydroxy acrylates, 2-10% of perfluoropolyether glycol, 1-2% of trimethylolpropane, 2-6% of dimethylol propionic acid, 1-3% of neutralized amine, 40-60% of water, 4-7% of acetone, 0.01-0.1% of a catalyst, and 0.1-1% of a polymerization inhibitor. The resin has excellent water dispersibility, good stability, milky white appearance with blue light, high resin solid content and moderate viscosity. The obtained coating has good stability, strong impact resistance and good application properties.

There is a need to provide anti-stain coating compositions which can be formulated as waterborne coating compositions. It is also desired that the coatings are durable, stain-resistant and at the same time scratch-resistant. It is further desired that the coating adheres well to the substrates used in consumer electronics or automotive industries, particularly to plastic substrates.

SUMMARY OF THE INVENTION

In order to address the above-mentioned desires, the present invention provides, in a first aspect, an aqueous dispersion containing a mixture of linear fluorinated and non-fluorinated polyurethane acrylates, obtainable by a method comprising the steps of:

a) reacting polyisocyanate A', multi-unsaturated OH-functional compound B', acid-functional polyol C' under urethane formation reaction conditions in the presence of intermediate X, wherein intermediate X is an OH-functional (per)fluoropolyether (PFPE) derivative present in an amount of 0.1-10 wt. % solid weight to the total weight of the reaction mixture, wherein no compounds with a functionality of 3 or higher are used,
b) adding neutralizer D to the reaction product of step a) and dispersing it in water, wherein intermediate X is selected from the list consisting of i. a hydroxy-terminated (per)fluoropolyether (X1),
ii. a reaction product of a PFPE diol with polyisocyanate A and acid-functional polyol C under urethane formation conditions (X2), and
iii. a reaction product of a PFPE diol with polyisocyanate A, multi-unsaturated OH-functional compound B and acid-functional polyol C under urethane formation conditions (X3).

In a further aspect, the invention provides a waterborne, UV curable coating composition, comprising the aqueous dispersion according to the invention.

The invention also provides a method of coating a substrate, comprising applying the coating composition according to the invention to a substrate and curing the coating composition by means of UV radiation.

In yet another aspect, the present invention provides an article coated with the coating composition according to the invention.

BRIEF DESCRIPTION OF THE DRAWINGS

FIG. 1(*a*) shows a substrate coated with the comparative coating prepared in Example 7. FIG. 1(*b*) shows a substrate coated with the coating according to Example 4, containing any of the polyurethane acrylate dispersions prepared in Examples 1-3.

DETAILED DESCRIPTION OF THE INVENTION

The present disclosure provides an aqueous dispersion containing a mixture of linear resins being fluorinated and non-fluorinated polyurethane acrylates. The fluorinated polymers are based on (per)fluoropolyether (PFPE). The polyurethane acrylates have ionic dispersing groups (e.g. acidic groups) that aid their dispersibility in water. In order to obtain the above-mentioned mixture of polymers, the polyurethane synthesis is done in one step ("one-pot synthesis") and that it is done in the presence of a particular fluorinated intermediate X.

Intermediate X

The intermediate X is an OH-functional PFPE derivative. (Per)fluoropolyethers (PFPE) are fluorinated polymers comprising a straight or branched fully or partially fluorinated polyoxyalkylene chain that contains recurring units having at least one catenary ether bond and at least one fluorocarbon moiety. PFPE can be divided into non-functional and functional; the former comprises a PFPE chain whose ends bear (per)haloalkyl groups, while the latter comprise a PFPE chain having at least two ends, wherein at least one end comprises a functional group. Functional PFPE, in particular mono- and bifunctional PFPE, comprise a PFPE chain having two ends, wherein one or both end(s) bear(s) a functional group. Preferably a bifunctional PFPE is used.

The OH-functional PFPE derivative useful as intermediate X in the present disclosure is selected from the list consisting of:

i. a hydroxy-terminated (per)fluoropolyether (X1),
ii. a reaction product of a PFPE diol with polyisocyanate A and acid-functional polyol C under urethane formation conditions (X2), and
iii. a reaction product of a PFPE diol with diisocyanate A, multi-unsaturated OH-functional compound B and acid-functional polyol C under urethane formation conditions (X3).

Intermediate X1

Intermediate X1 can be a hydroxy-terminated (per)fluoropolyether, which are functional (per)fluoropolyethers (PFPE) containing one or more OH groups at each of both ends, preferably one at each end. The terminating group can also be —$CH_2OH$. Such compounds can also be referred to as PFPE diols. Hydroxy-terminated (per)fluoropolyether preferably has a number average molecular weight of from 400 to 3000. Mn can be determined by gel permeation chromatography (GPC) using a polystyrene standard with tetrahydrofuran as the mobile phase.

Hydroxy-terminated (per)fluoropolyether can have a general structure HO—$(CF_2—CF_2—O)_n$—OH or HO—$(CF_2—CF_2—O)_n—(CF_2—O)_m$—OH. It can also include blocks with ethylene oxide units and have the general structure:

$$HO-(CH_2CH_2O)_p-CH_2-CF_2-R_f-CF_2-CH_2-(OCH_2CH_2)_q-OH$$

wherein p and q are integers independently chosen from 0 to 50, preferably from 1 to 50, wherein $R_f$ represents a bifunctional radical having (per)fluoropolyether structure $(CF_2CF_2O)_n$, $(CF_2O)_m$ or $(CF_2—CF_2—O)_n—(CF_2—O)_m$, and wherein n and m are integers independently chosen from 1 to 100. When both p and q are not zero, the resulting polymer has a better dispersibility in water. Preferably, p is in the range 1-5 and q is in the range 1-5. Instead of —OH group also —$CH_2OH$ group can be used.

Hydroxy-terminated (per)fluoropolyethers are commercially available from Solvay as Fluorolink® PFPE, or Fomblin® PFPE, e.g. Fluorolink® 5174X, Fluorolink® E10H, Fluorolink® PEG45.

Intermediate X2

As a second option, intermediate X can be a reaction product of a PFPE diol with polyisocyanate A and acid-functional polyol C. After the reaction, intermediate X2 is both hydroxyl-functional and acid-functional.

The PFPE diol can be the same or different as the hydroxy-terminated (per)fluoropolyether described above for X1. During the preparation of X2 the amount of the PFPE diol is preferably in the range 10-90 wt. %, more preferably 20-80 wt. %, based on the total weight of the reaction mixture.

The polyisocyanate A is a compound with reactive isocyanate groups and has a functionality of at least 2. Also mixtures of polyisocyanates can be used. The polyisocyanate can be aliphatic or aromatic. Examples of suitable polyisocyanates include hexamethylene diisocyanate, 2,2,4- and/or 2,4,4-trimethyl hexamethylene diisocyanate, p- and m-tetramethyl xylene diisocyanate, methylene bis(4-cyclohexyl isocyanate) (hydrogenated MDI), 4,4-methylene diphenyl isocyanate (MDI), p- and m-phenylene diisocyanate, 2,4- and/or 2,6-tolyene diisocyanate (TDI) and addicts thereof, and isophorone diisocyanate (IPDI). Preferred polyisocyanates include aliphatic diisocyanates such as IPDI and hexamethylene diisocyanate. More preferably, IPDI is used.

During the preparation of X2 the amount of A is preferably in the range 0.1-20 wt. %, more preferably 1-10 wt. %, based on the total weight of the reaction mixture.

Acid-functional polyol C has both acidic and hydroxyl functionalities. Preferably, the acid-functional polyol C is a diol. Preferably, it contains at least one carboxylic acid group. Preferably, the carboxyl group is a tertiary acid group.

Preferably, compound C has the following formula:

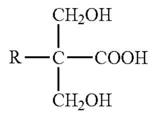

wherein R is a hydrogen or a C1-16 alkyl group. Preferably R is a C1-C3 alkyl group. More preferably, compound C is 2,2-dimethylolpropionic acid (DMPA) or 2,2-dimethylolbutanoic acid (DMBA). Such compounds are commercially available e.g. DMPA HA-0135 from GEO Chemicals.

Alternatively, the acid functionality can also come from a sulphonic acid group, e.g. alkyl or arylsulfonates. Examples includes salts of 2-((2-aminoethyl)amino)ethane sulfonate; 2,4-diaminobenzene sulfonate, particularly sodium salts thereof.

Compound C can also be a polymer, e.g. acid functional linear polyester polyol. Such compounds are commercially available e.g. DMPA polyol HA-0135LV and DMPA polyol HA-0135 from GEO Chemicals. If compound C is a polymer, then it preferably has an OH value of 20-190, more preferably 50-150 mg KOH/g resin. It preferably has an acid value of 20-250, more preferably 50-200 mg KOH/g resin. The acid value can be measured by potentiometric titration, e.g. in accordance with DIN EN ISO 3682. The hydroxyl value can be measured by potentiometric titration using the TSI method, e.g. according to ASTM E1899-08.

The reaction with acid-functional polyol C allows to introduce acidic groups in the polymer chain, which contributes to water dispersibility of the resulting polyurethane acrylate.

During the preparation of X2 the amount of C is preferably in the range 0.1-20 wt. %, more preferably 0.5-10 wt. %, based on the total weight of the reaction mixture.

In the preparation of X2 compounds other than those mentioned above can be used, which are able to react under the urethane forming conditions. However, in certain embodiments, no compounds with a functionality of 3 or more are used. Herein, functionality means either hydroxyl or isocyanate functionality. Examples of such compounds with a functionality of 3 or more include polyols such as trimethylolpropane. Such compounds introduce branching in the polymer chain and branching can lead to viscosity problems. Therefore, it is preferred that the resulting polymers are linear and non-branched.

The reaction conditions of forming the urethane compound are generally known to the skilled person. The reaction temperature can be in the range 40-160° C., preferably in the range 50-100° C. Conventional catalysts can be used such as dibutyl tin dilaurate (DBTDL), stannous octoate, diazobicyclo (2.2.2) octane (DABCO), Zn ACAC, tin octoate. The amount of catalyst is preferably from 0.005 to 1 part by weight per 100 parts by weight of the urethane forming monomers. Suitable solvents can be utilized such as n-butyl acetate, N-methyl-pyrrolidone, toluene. Preferably, the solvent is water-miscible.

The reaction with acid-functional polyol C can be done after the reaction with polyisocyanate A, or simultaneously.

Preferably, first the reaction with polyisocyanate A is performed, after which acid-functional polyol C is added. In that case, the first reaction is performed in a molar isocyanate excess. The molar excess of A is preferably in the range 1.1 to 5, more preferably in the range 2-4.

The progress of the reaction is monitored by analyzing the NCO content over time. The reaction is stopped when no NCO content is detected anymore.

Intermediate X2 preferably has a number average molecular weight of from 400 to 3000, more preferably from 500 to 2000. Mn can be determined by gel permeation chromatography (GPC) using a polystyrene standard with tetrahydrofuran as the mobile phase.

Intermediate X3

As a third option, intermediate X3 can be used, which is a reaction product of a PFPE diol with polyisocyanate A, multi-unsaturated OH-functional compound B and acid-functional polyol C. The obtained intermediate X3 is both hydroxyl- and acid-functional, and also contains unsaturated (e.g. acrylate) functionality.

The PFPE diol can be the same or different to the hydroxy-terminated (per)fluoropolyether described above for X1. Polyisocyanate A and acid-functional polyol C can be used as described above for X2. During the preparation of X3 the amount of the PFPE diol is preferably in the range 10-90 wt. %, more preferably 15-60 wt. %, based on the total weight of the reaction mixture. The amount of A is preferably in the range 0.1-30 wt. %, more preferably 1-20 wt. %, based on the total weight of the reaction mixture. The amount of C is preferably in the range 0.1-20 wt. %, more preferably 0.5-10 wt. %, based on the total weight of the reaction mixture.

Multi-unsaturated OH-functional compound B is preferably an OH-functional (meth)acrylate monomer, which is added to the other reagents under conditions of urethane formation reaction.

OH-functional (meth)acrylate monomer B has at least one OH group and it preferably has 1 to 5 (meth)acrylate groups. More preferably, it only has one hydroxyl group (monofunctional alcohol). It is preferred to use compounds with a molecular mass not higher than 1,500. Suitable compounds include (meth)acrylic esters of polyols, e.g. of ethylene glycol, pentaerythritol and dipentaerythritol. Examples include 2-hydroxyethyl (meth)acrylate, penta-erythritol (meth)acrylate, penta-erythritol di(meth)acrylate, penta-erythritol tri(meth)acrylate, dipenta-erythritol (meth)acrylate, dipenta-erythritol di(meth)acrylate, dipenta-erythritol tri(meth)acrylate, dipenta-erythritol tetra(meth)acrylate and dipenta-erythritol penta(meth)acrylate. Preferred compound E is dipenta-erythritol pentaacrylate (DPPA) or its mixture with dipenta-erythritol hexaacrylate (DPHA).

During the preparation of X3 the amount of B is preferably in the range 0.1-60 wt. %, more preferably 1-50 wt. %, based on the total weight of the reaction mixture.

Similarly to X2, in the preparation of X3 also other compounds than mentioned above can be used, which are able to react under the urethane forming conditions. However, it is also preferred that no compounds with a functionality of 3 or more are used.

The reaction of PFPE with compounds A, B and C can be done simultaneously, or in any order. For example, first the reaction of PFPE with compound A can be performed, then compound B be added and then compound C. All reaction steps are preferably done under the conditions of urethane formation. Suitable reaction conditions of urethane formation are known to the skilled person. Generally, the conditions described above for intermediate X2 can be used. The progress of the reaction can be monitored by analyzing the NCO content over time. The reaction is stopped when no NCO content is detected anymore.

Intermediate X3 preferably has a number average molecular weight of from 400 to 3000, more preferably from 800 to 2500. Mn can be determined by gel permeation chromatography (GPC) using a polystyrene standard with tetrahydrofuran as the mobile phase.

After both steps (b) and (c) (in any order) a carboxyl-functional, unsaturated polyurethane is obtained. This polyurethane preferably has a linear structure. The polyurethane preferably has a weight average molecular weight Mw in the range 2,000-20,000, more preferably in the range 4,000-15,000. The polyurethane preferably has a number average molecular weight Mn in the range 800-5,000, more preferably in the range 1,000-3,000.

The resulting polyurethane preferably has an acid value in the range 10-50 mg KOH/g. The acid value can be measured by potentiometric titration, e.g. in accordance with DIN EN ISO 3682. Preferably, the resulting polyurethane does not have OH functionality. The hydroxyl value is preferably $<5$ mg KOH/g, more preferably 0 mg KOH/g. The hydroxyl value can be measured by potentiometric titration using the TSI method, e.g. according to ASTM E1899-08.

Aqueous Dispersion

After intermediate X is provided or prepared as described above, the aqueous dispersion according to the present disclosure can be prepared by a method comprising the following steps.

Step (a)

In step (a), polyisocyanate A' is reacted with multi-unsaturated compound B' and acid-functional polyol C' under urethane formation reaction conditions in the presence of intermediate X.

Although any of the intermediates X1, X2 or X3 can be used as intermediate X, in some embodiments it can be preferred to use intermediate X2 or X3, and not X1.

As polyisocyanate A', the polyisocyanates described above for polyisocyanate A can be used. Polyisocyanate A' can be the same or different to the polyisocyanate A used in the synthesis of intermediate X2 or X3 (in case X2 or X3 is used in this step). The amount of A' used in the reaction is preferably in the range 0.1-50 wt. %, more preferably 1-30 wt. %, based on the total weight of the reaction mixture.

As multi-unsaturated OH-functional compound B', the compounds described above for compound B can be used. Multi-unsaturated compound B' can be the same or different to the compound B used in the synthesis of intermediate X3 (in case X3 is used in this step). The amount of B' used in the reaction is preferably in the range 10-90 wt. %, more preferably 20-80 wt. %, based on the total weight of the reaction mixture.

As acid-functional polyol C', the acid-functional polyols described above for compound C can be used. It can be the same or different to the acid-functional polyol C used in the synthesis of intermediate X2 or X3 (in case X2 or X3 is used in this step). The amount of C' used in the reaction is preferably in the range 0.1-20 wt. %, more preferably 1-10 wt. %, based on the total weight of the reaction mixture.

In the preparation of the dispersion no reactive compounds with a functionality of 3 or higher more are used. Examples of such compounds include polyols such as trimethylolpropane. Such compounds introduce branching in the polymer chain, which can lead to viscosity problems. Therefore, it is preferred that the resulting polymers are linear and non-branched. In some embodiments it can be preferred that the resulting mixture in step (a) does not contain any branched polymers. Branched polymers mean in this case those obtained from monomer(s) with a functionality of 3 or higher.

Intermediate X is preferably present only in a small amount during the synthesis. Particularly, the amount of intermediate X is 0.1-10 wt. %, more preferably 0.2-5 wt. %, even more preferably 0.5-3 wt. % based on the solid weight of X to the total weight of the reaction mixture. The use of small amounts of intermediate X in step (a) allows to obtain a mixture of fluorinated and non-fluorinated resins with the optimal ratio, instead of predominantly fluorinated resins. If there is a too low amount of fluorinated resins, the coating does not exhibit sufficient easy clean properties. If there is a too high amount of fluorinated resins in the resulting resin mixture, some of the coating properties are believed to be compromised. High amounts of fluorinated resins were also found not to be necessary in order to achieve the desired easy clean and anti-stain properties. Intermediates X as described above can be quite costly to make because of the fluorine-containing reactant PFPE diol.

The reaction conditions are those of forming urethane compounds. These are known to the skilled person. Generally, the above-described conditions used in the synthesis of X2 can be used. Preferably, the synthesis is performed in a solvent, such as those mentioned above for the synthesis of X2.

The reaction of step (a) results in a mixture of fluorinated and non-fluorinated polyurethane acrylates, which preferably have a linear structure. The polyurethane acrylates contain an acid-functionality that aids dispersibility in water and also unsaturated functionality (e.g. acrylate) for UV-curing properties.

In the obtained mixture of resins, non-fluorinated resins preferably constitute at least 50 wt. %, more preferably at least 70 wt. %, even more preferably at least 90 wt. % of the total weight. Best results are achieved when in the final resin mixture only 0.1-10 wt. % of the resins are fluorinated, preferably 0.1-5 wt. %, based on the total weight of the resin mixture.

Step (b)

In step (d), the reaction product of step (a) is neutralized with a neutralizer D and dispersed in water.

Neutralizers for acid-functional resins are known. For example, neutralizer D can be ammonia or a tertiary amine, or a mixture of amines. Neutralizer D is preferably a saturated tertiary amine, e.g. triethylamine, tripropyl amine, triethanolamine, diethylenetriamine, methylamine and N,N-dimethyl ethanol amine (DMEA).

Preferably, DMEA is used. Advantages of the use of a saturated tertiary amine, such as DMEA, is that the resulting polymer is better dispersible in water.

Neutralizer D is preferably added in an amount to achieve a neutralization degree of 20-150%, more preferably 80-120% of the acidic groups of the polyurethanes, calculated as the molar ratio of the base groups from the neutralizer and the carboxylic groups from polyurethane.

The resulting neutralized mixture of polyurethane acrylates can be dispersed in water.

The aqueous dispersion preferably has a solid content in the range 1-70 wt. %.

Preferably, the aqueous dispersion does not contain branched polymers.

In some embodiments, it is preferred that the aqueous dispersion is free from silicon-containing polymers, in particular, from silicon-containing film-forming (binder) resins.

The obtained aqueous dispersion of the fluorinated and non-fluorinated resins can be used in preparation of coating compositions.

Coating Composition

In another aspect, the present invention provides a water-borne, UV curable coating composition comprising the above-described aqueous dispersion. The unique property of the described aqueous dispersion is that no other binder resins are necessary to be present in the coating composition, in order to achieve the desired coating properties such as easy clean, anti-stain and anti-scratch coatings. Coating compositions containing non-fluorinated resins with separately added fluorine-containing additives may exhibit compatibility problems, which is not the case for the present coating composition. Therefore, preferably, there are no other binder resins present in the coating composition.

The coating composition preferably comprises at least 10 wt. %, more preferably at least 30 wt. %, yet more preferably at least 50 wt. %, or even at least 80 wt. % of the aqueous dispersion described above, based on the total weight of the coating composition. For example, the coating composition can comprise 10-99 wt. % of the aqueous dispersion described above, more preferably 30-99 wt. %, yet more preferably 50-99 wt. %, based on the total weight of the coating composition.

Although not necessary, it is possible to use additional binder resins in the coating composition. In some embodiments, therefore, the coating composition contains at least one polymer that is preferably different from the polyurethane acrylates described above. The additional binder resins can for example be polyesters, polyurethanes, poly (meth)acrylates. Preferably, the additional polymer is a poly(meth)acrylate. Under "poly(meth)acrylates" polymers are understood that have a crosslinkable (meth)acrylate functionality. Examples include poly(methyl methacrylate), poly(methacrylic acid), polymethacrylate, poly(ethyl methacrylate), poly(2-hydroxyethyl methacrylate), but also polyurethane (meth)acrylate or polyester (meth)acrylate.

The coating composition can also comprise copolymerizable monomers and oligomers. Examples of such monomers include (meth)acrylate monomers, particularly methyl (meth)acrylate, ethyl (meth)acrylate, isopropyl (meth)acrylate, butyl (meth)acrylate, isobutyl (meth)acrylate, ethyl hexyl (meth)acrylate, dipentaerythritol hexaacrylate, acrylonitrile, methacryl amide. Also vinyl monomers can be used, e.g. vinyl acetate, vinyl propionate, vinyl butyrate, styrene.

Preferably, the coating composition comprises at least one photoinitiator or a mixture thereof. Photoinitiators generate free radicals when exposed to radiation energy. Any suitable UV photoinitiator known in the art can be used. Suitable photoinitiators include benzoin derivatives, benzile ketales, α-hydroxyalkylphenones, monoacylphosphine oxide (MAPO) and bisacylphosphine oxides (BAPO), such as diphenyl(2,4,6-trimethylbenzoyl)phosphine oxide, 1-hydroxy-cyclohexyl-phenyl-ketone, bis(2,4,6-trimethylbenzoyl)-phenylphosphineoxide, bis(2,6-dimethoxybenzoyl)-2, 4,4-trimethylpentyl-phosphine oxide, 2-hydroxy-2-methyl phenyl-propan-1-one, 2-methyl-1[4-(methylthio)phenyl]-2-morpholono-propan one, a phenyl glyoxylic acid methyl ester. Mixtures of these compounds may also be employed. Photoinitiators are commercially available, e.g. from IGM Resins.

The photoinitiator is preferably present in amount of from 0.1 to 10 wt. %, for example from 0.5 to 5.0 wt. % or from 0.5 to 2.5 wt. %, based on the total weight of the composition.

Preferably, the coating composition is free from silicon-containing polymers, in particular, from silicon-containing film-forming (binder) resins.

The coating composition is preferably waterborne. Waterborne coating compositions comprise water as the major liquid phase when preparing and/or applying the coating composition. "Major liquid phase" means that water constitutes at least 50 wt. % of the liquid phase, preferably at least 80 wt. %, more preferably at least 90 wt. %, in some embodiments even 100 wt. %. The coating composition preferably contains 20 to 80% by weight of water, based on the total weight of the coating composition.

Optionally, the coating composition can in addition contain organic solvents. For example, organic solvents can be present up to 40%, preferably, up to 30% by weight of the liquid phase. It may be preferred in some embodiments that the coating composition contains less than 10 wt. % of organic solvents, preferably less than 5 wt. %, or even does not contain organic solvents, based on the total weight of the coating composition.

Example of suitable organic solvents include alcohols (such as ethanol, isopropanol, n-butanol, n-propanol), esters (such as ethyl acetate, propyl acetate), aromatic solvents (such as toluene), ketone solvents (such as acetone, methyl ethyl ketone, methyl isobutyl ketone, cyclohexanone, diacetone alcohol); aliphatic hydrocarbons; chlorinated hydrocarbons (such as $CH_2Cl_2$); ethers (such as diethyl ether, tetrahydrofuran, propylene glycol monomethyl ether) and mixtures thereof. Preferably, the solvent is water-miscible. Preferred organic solvents include butyl acetate, methyl isobutyl ketone (MIBK), methyl ethyl ketone (MEK), propylene glycol monomethyl ether and methoxy propyl acetate (PMA), or mixtures thereof.

The solid content of the coating composition according to the invention can be in the range from 1 to 90 wt. %, preferably 5 to 65 wt. %, more preferably 10 to 50 wt. %.

The coating composition can further comprise conventional additives, such as fillers, antioxidants, matting agents, pigments, abrasion resistant particles, flow control agents, surfactants, plasticizers, adhesion promotors, thixotropic agents, light stabilizers and others.

The present disclosure provides a coating composition that does not require high amounts of fluorinated resins to be present in order to have the desired performance in easy clean, anti-stain and anti-scratch properties of the coating. Moreover, the binder resins, which represent a mixture of fluorinated and non-fluorinated polyurethane acrylates, have good compatibility due to the one-pot synthesis.

The present disclosure further provides a method of coating a substrate, comprising applying the coating composition according to the present disclosure to a substrate and curing the coating composition by means of UV radiation.

The coating composition can be applied onto a wide range of substrates by conventional techniques including spraying, rolling, blade-coating, pouring, brushing or dipping. After evaporation of water and optionally organic solvents, if present, the coating composition results in a coating that is dust-dry to slightly tacky.

Curing is then induced by means of UV radiation. Any suitable source of UV radiation can be used, e.g. Hg lamps, metal halide lamps, xenon lamps, UV-LED lamps. It is preferred to use UV-LED lamps. Skilled person is able to determine suitable conditions for curing by UV radiation.

Curing of the coating composition can be done at ambient conditions, e.g. room temperature. Room temperature is understood here as from 15 to 30° C. The curing can also be accelerated by heating. The coated substrate can be heated to a temperature in the range 40-100° C., more preferably 50-80° C. Conventional methods can be used, e.g. placing in an oven. Heating is preferably done before or simultaneously with UV curing.

The coating composition according to the present invention can be applied to a wide range of substrates including metallic and non-metallic substrates. Suitable substrates include polycarbonate acrylonitrile butadiene styrene (PC/ABS), polycarbonate, polyacrylate, polyolefin, polyamide, polystyrene, polyamide, glass, wood, stone, aluminium, aluminium alloys.

The coating composition according to the present invention can be used as a single layer applied directly to the substrate, or in multilayer systems, e.g. as a primer, basecoat or clearcoat.

The coating composition according to the present invention can be used in various coating industries, such as, consumer electronics, automotive, packaging, wood flooring and furniture, home appliance, glass and windows, sports equipment.

The present invention further provides an article comprising a substrate coated with the coating obtained from the coating composition of the invention. The coatings according to the present invention have exceptionally good general properties including adhesion and scratch resistance. In addition, the coatings also have excellent easy clean and anti-stain properties as can be tested with a permanent marker pen and chemicals.

EXAMPLES

The present disclosure will be demonstrated with reference to the following examples. All parts and percentages are by weight unless specified otherwise.

Fluorolink E10H—hydroxyl-functional PFPE polymer from Solvay, solid content 100 wt. %

Kayarad DPHA—mixture of dipentaerythritol hexaacrylate and dipentaerythritol pentaacrylate from Nippon Kayaku chemical (Wuxi) Co., Ltd., hydroxyl value 40-50 mg KOH/g DMPA—dimethylol butanoic acid from Shanghai Dibo Biotechnology Co., Ltd.

DMEA—dimethyl ethanol amine

Example 1

Polyurethane Acrylate Dispersion Prepared Using PFPE Diol (X1)

Isophorone diisocyanate (26.3 g), dibutyltin dilaurate (0.2 g), butylated hydroxytoluene (0.2 g) and butyl acetate (22.2 g) were placed into a four-neck round bottom flask that is equipped with an agitator and a condenser. Fluorolink E10H (2 g) was added to the mixture and heated to 60° C. The mixture was cooked at 60° C. for 1 hour. Then Kayarad DPHA (165.76 g) was dropped into the mixture within 2 hours at 60° C. and the mixture was cooked at 60° C. for one hour. Then dimethylol propionic acid (DMPA) (7.94 g) was added into the mixture at once and the temperature was increased to 80° C. The mixture was cooked at 80° C. for two to three hours or more until NCO group completely disappeared. After no NCO group could be detected, the temperature was decreased to 60° C. and 2-(dimethylamino) ethanol (DMEA) (4.75 g) was added into the mixture. The mixture was maintained at 60° C. for another hour, then water (300 g) was added to the mixture in 10 min at 60° C. with high speed agitation to obtain the aqueous dispersion.

Example 2

Polyurethane Acrylates Prepared Using X2

Step 1—Synthesis of Intermediate X2

Hexamethylene diisocyanate (8.4 g), dibutyltin dilaurate (0.1 g) and butyl acetate (25 g) were placed into a four-neck round bottom flask that is equipped with an agitator and a condenser. Fluorolink E10H (84.9 g) and dimethylol propionic acid (DMPA) (6.69 g) were added together to the mixture at once at 60° C. After that the mixture was cooked at 60° C. for 1 hour, and then the temperature was increased to 90° C. and react for another 2-3 hours or more until no NCO groups can be detected. After no detection of NCO group, the temperature is decreased to 60° C. and 2-(dimethylamino) ethanol (DMEA) (3.78 g) is added into the mixture. The mixture is kept at 60° C. for another hour, then poured into container and packed for next step. The resulting polymer has Mn 912, Mw 1439, PD 1.58, as measured by GPC, solid content 80 wt. %.

Step 2—Synthesis of Polyurethane Acrylate Dispersion

Hexamethylene diisocyanate (30.84 g), dibutyltin dilaurate (0.3 g), BHT (0.3 g) and butyl acetate (33.3 g) were placed into a four-neck round bottom flask that is equipped with an agitator and a condenser. The intermediate solution X2 (5 g) prepared in Step 1 was added to the mixture and heated to 60° C. The mixture was cooked at 60° C. for 1 hour. Then Kayarad DPHA (260 g) was dropped into the mixture within 2 hours at 60° C. and the mixture was cooked at 60° C. for one hour. Then dimethylol propionic acid (DMPA) (12.3 g) added into the mixture at once, and then increase temperature to 80° C. The mixture was held at 80° C. for two to three hours or more until NCO group completely disappeared. After no detection of NCO group, the temperature was decreased to 60° C. and 2-(dimethylamino) ethanol (DMEA) (7.35 g) was added into the mixture. The mixture was kept at 60° C. for another hour, then water (450 g) was added in 10 mins at 60° C. with high speed agitation to obtain the aqueous dispersion.

Example 3

Polyurethane Acrylates Prepared Using X3—PFPE Modified Partially Capped Urethane Acrylate

Step 1—Synthesis of Intermediate X3

Isophorone diisocyanate (12.08 g), dibutyltin dilaurate (0.1 g), butylated hydroxytoluene (0.1 g) and butyl acetate (25 g) were placed into a four-neck round bottom flask that is equipped with an agitator and a condenser. Fluorolink E10H (46.22 g) was added dropwise to the mixture at 60° C. and the mixture was heated at 60° C. for 1 hour. Then Kayarad DPHA (38.06 g) was dropped into the mixture within 1 hour at 60° C. and the mixture was cooked at 60° C. for another hour. Then dimethylol propionic acid (DMPA) (3.64 g) was added to the mixture at once and the temperature was increased to 80° C. The mixture was cooked at 80° C. for two to three hours or more until the NCO group completely disappeared. After no NCO group could be detected, the temperature was decreased to 60° C. and 2-(dimethylamino) ethanol (DMEA) (2.17 g) was added to the mixture. The mixture was kept at 60° C. for another hour, then poured into container and packed for the next step. The resulting polymer has Mn 1241, Mw 1642, PD 1.32, as measured by GPC, solid content 80 wt. %.

Step 2—Synthesis of Polyurethane Acrylate Dispersion

Hexamethylene diisocyanate (30.84 g), dibutyltin dilaurate (0.3 g), butylated hydroxytoluene (0.3 g) and butyl acetate (33.3 g) were placed into a four-neck round bottom flask that is equipped with an agitator and a condenser. Solution of the intermediate from step 1 (8.15 g) was added to the mixture and heated to 60° C. The mixture was heated at 60° C. for 1 hour. Then Kayarad DPHA (256.89 g) was dropped into the mixture within 2 hours at 60° C. and the mixture was cooked at 60° C. for one hour. Then dimethylol propionic acid (DMPA) (12.3 g) was added into the mixture at once and the temperature was increased to 80° C. The mixture was heated at 80° C. for two to three hours or more until NCO group completely disappeared. After no NCO group could be detected, the temperature was decreased to 60° C. and 2-(dimethylamino) ethanol (DMEA) (7.35 g) was added to the mixture. The mixture was kept at 60° C. for another hour, then water (450 g) was dropped in 10 min at 60° C. with high speed agitation to obtain the aqueous dispersion.

Example 4

Preparation of Coating Compositions and Coated Substrates

For evaluating the properties of the polyurethane acrylates synthesized in Examples 1-3, coating compositions were prepared according to Table 1. As photoinitiators, Irgacure 184 and Irgacure TPO were used, both available from BASF. As wetting additives, TEGO 4100 and TEGO 425 were used, available from Evonik.

TABLE 1

| Ingredient | Amount, g |
|---|---|
| Polyurethane acrylate dispersion (solid content 40 wt. %) | 50 |
| Photoinitiators (solid content 60 wt. %) | 2 |
| Cosolvent* | 1 |
| Wetting additives | 0.4 |

*Cosolvent—propylene glycol monomethyl ether

The coating compositions are sprayed onto PC/ABS panels and put in an oven at 60° C. for 8-10 min. After that the panels passed through the machine RW-UVAN301-30 aks where they were irradiated by UV light using Hg lamp.

Example 5

Stain Resistance Tests

The coated substrates obtained in Example 4 were subjected to stain resistance tests using the chemicals listed in Table 2. The chemicals were applied to the substrate, held for 1 hour at room temperature and then wiped off. No discoloration or peel off of the coating was observed.

TABLE 2

| Staining agent | Rating |
|---|---|
| Lipstick (red) | Grade A |
| Coffee (Nestle 3 in 1) | Grade A |
| Yellow mustard | Grade A |
| Water soluble ink | Grade A |
| Wax pencil (black) | Grade A |
| Red wine (Beaujolais) | Grade A |
| Beer - Heineken | Grade A |
| Coca-cola regular | Grade A |
| Sunscreen (Nivea SPF15) | Grade A |
| Lotion (Nivea) | Grade A |
| Artificial sweat (pH 4.7, pH 8.7) | Grade A |

The rating is given according to the following scale: Grade A—no effect, grade B—minor surface change and discoloration, grade C—coating shrinking or softening, grade D—coating blistering or deformation.

There was no difference observed between the staining resistance of the coatings prepared based on the polyurethane acrylate dispersions prepared in Examples 1-3. All of them received Grade A rating for all the chemicals, see Table 2.

As can be seen from the above table, the coating compositions according to invention have an excellent stain resistance to common chemicals.

The coated substrates were also tested for resistance to more severe staining. The chemicals from Table 3 were applied to the coated substrates as described above at 40° C., 90% RH for 168 h. After the test, the chemicals were removed, the surface was cleaned first with running tap water, then with a soap solution if staining was visible, and then with isopropyl alcohol if the staining was still visible.

TABLE 3

| Staining agent | Rating |
|---|---|
| Sunscreen, Banana Boat SPF 30 | Grade A |
| Dish soap, Ivory | Grade A |
| Fantastic cleaner | Grade A |
| 409 Cleaner | Grade A |
| Mustard, French's yellow | Grade A |
| Coca cola | Grade A |
| Alcohol, 70% isopropyl | Grade A |
| Olive oil, extra virgin | Grade A |
| Lotion, Vaseline Intensive Care | Grade A |
| Ketchup, Heinz | Grade A |
| Acetone | Grade A |
| Sweat, Artificial | Grade A |
| Hand Cream, Fruits & Passion Cucina | Grade A |
| Red Lip Polish, Maybelline | Grade A |
| Rouge, Maybelline Expert Wear Blush Beach Plum | Grade A |
| Mayonnaise, Kraft | Grade A |

There was no difference observed between the staining resistance of the coatings prepared based on the polyurethane acrylate dispersions prepared in Examples 1-3. All of them received Grade A rating for all the chemicals, see Table 3.

Example 6

Scratch Resistance Tests

The coated substrates obtained in Example 4 are subjected to 50 cycles double rubes with a chemical as listed in Table 4.

TABLE 4

| Chemical | Rating |
|---|---|
| Simulated sweat - acidic (pH 5.0) | Grade 5 |
| Simulated sweat - basic (pH 8.8) | Grade 5 |
| Motor oil | Grade 5 |
| Lemon juice | Grade 5 |
| Windex (ammonia) | Grade 5 |
| Ethanol | Grade 5 |
| 100% virgin olive oil | Grade 5 |

The treated panel were visually examined after the test and give a grade 1-5: grade 5—no visible surface change, grade 4—minor change in surface gloss, grade 3—moderate deterioration/discoloration/staining of surface, grade 2—severe softening/staining/catering or deterioration of surface, grade 1—total dissolution of painted surface and expose substrate.

There was no difference observed between the scratch resistance of the coatings prepared based on the polyurethane acrylate dispersions prepared in Examples 1-3. All of them received Grade 5 rating for all the chemicals, see Table 4.

Example 7

Comparative Example

In this example, a coating composition is prepared containing a commercial waterborne UV curable resin mixed with a polyurethane additive for easy clean properties. This is then compared to the coating composition according to the invention, which is prepared in a "one-pot synthesis".

Preparation of a Polyurethane Additive

Isophorone diisocyanate (15.42 g), n-butyl acetate (17.6 g), dibutyl tin dilaurate (0.1 g) and butylated hydroxytoluene (0.1 g) were placed into a four-neck round bottom flask that is equipped with an agitator and a condenser. Fluorolink E10H (58.97 g) was dropped into the mixture at 60° C. for one hour. The reaction mixture was heated at 60° C. for half an hour. Then Kayarad DPHA (20.47 g) was dropped into the mixture within half hour at 80° C. and the mixture was cooked at 80° C. for half an hour. Then dimethylol butanoic acid (DMBA) (5.14 g) was added into the mixture at 80° C., cooked at 80° C. for one hour. Then the temperature increased to 90° C. and the reaction proceeded until no NCO groups were detected. The reaction mixture was cooled down to 60° C. and DMEA (3.41 g) was added to the mixture and stirred for another half hour at 60° C.

The resulting polyurethane has Mn 1106, Mw 4948, PD 4.5. The acid value of the polyurethane is 19.5 mg KOH/g before neutralization, the OH value 0 mg KOH/g.

Preparation of Comparative Coating Composition

Comparative coating composition is prepared with the ingredients listed in Table 5.

TABLE 5

| | Amounts, g |
|---|---|
| Olester RA7011 (solid content: 45%) | 60 |
| Dispersion of polyurethane additive (solid content: 50 wt. %) | 0.24 |
| Photoinitiators (solid content: 60 wt. %) | 2 |
| Wetting agent | 0.3 |

Oleaster RA7011 is a commercially available waterborne UV curable resin from Mitsui Chemicals. The coating composition contains 0.4 wt. % of the polyurethane additive prepared in the previous step and added as a 50 wt. % dispersion in water.

The coating composition was applied onto PC/ABS substrates and cured by exposure to ultraviolet light.

Permanent marker with a black ink was used to draw a line on the coated substrate.

FIG. 1(*a*) shows the substrate coated with the comparative coating prepared in Example 7. FIG. 1(*b*) shows the substrate coated with the coating according to the present disclosure, containing any of the polyurethane acrylate dispersions prepared in Examples 1-3.

It can be seen that the black ink does not shrink on FIG. 1(*a*) when a fluoro-containing additive is used in a mixture with a WB UV resin. In contrast, the black ink shrank to beads on the surface of the coating according to the present disclosure. Therefore, the "one-pot synthesis" according to the present disclosure results in a coating with an even better anti-stain performance than a coating containing a mixture of a resin and an easy-clean additive.

The invention claimed is:

1. An aqueous dispersion containing a mixture of linear fluorinated and non-fluorinated polyurethane (meth)acrylates, wherein the dispersion is obtained by a method consisting of steps:

a) reacting in a reaction mixture comprising polyisocyanate A', multi-unsaturated, OH-functional compound B', and acid-functional polyol C' under urethane formation reaction conditions in the presence of intermediate X, wherein intermediate X is an OH-functional (per) fluoropolyether (PFPE) derivative present in an amount of 0.2-5 wt. % solid weight to the total weight of the reaction mixture, wherein no compounds with a hydroxyl or isocyanate functionality of 3 or higher are used, wherein the reaction mixture comprises 1-30 wt. % polyisocyanate A', 20-80 wt. % multi-unsaturated, OH-functional compound B', and 1-10 wt. % acid-functional polyol C', based on the total weight of the reaction mixture, and b) adding neutralizer D to the reaction product of step a) and dispersing it in water, wherein intermediate X is selected from the list consisting of:

i. a hydroxy-terminated (per) fluoropolyether (X1), ii. a reaction product X2 of a PFPE diol with polyisocyanate A and acid-functional polyol C under urethane formation reaction conditions, wherein the reaction product X2 has no NCO content, and iii. a reaction product X3 of a PFPE diol with polyisocyanate A, multi-unsaturated, OH-functional compound B and acid-functional polyol C under urethane formation reaction conditions, wherein the reaction product X3 has no NCO content, wherein polyisocyanates A and A' have a functionality of 2, wherein no compounds with a hydroxyl or isocyanate functionality of 3 or higher are used in the preparation of X2 and X3, wherein the multi-unsaturated OH-functional compound B or B' is dipentaerythritol pentaacrylate (DPPA), wherein each of the hydroxy-terminated (per)fluoropolyether (X1) and the PFPE diol has a general structure:

$$HO-(CH_2CH_2O)_p-CH_2-CF_2-R_f-CF_2-CH_2-(OCH_2CH_2)_q-OH$$

wherein p and q are integers independently chosen from 1 to 5, $R_f$ represents a bifunctional radical having perfluoropolyether structure $O(CF_2CF_2O)_n$, $O(CF_2O)_m$ or $O(CF_2-CF_2-O)_n-(CF_2-O)_m$, and wherein n and m are integers independently chosen from 1 to 100, wherein acid-functional polyol C or C' is 2,2-dimethylolpropionic acid (DMPA) or 2,2-dimethylolbutanoic acid (DMBA), and wherein the content of the linear non-fluorinated polyurethane (meth)acrylates in the mixture of linear fluorinated and non-fluorinated polyurethane (meth)acrylates, is at least 70 wt. %.

2. The dispersion according to claim 1, wherein the neutralizer D is a saturated tertiary amine.

3. A waterborne, UV curable coating composition comprising the dispersion according to claim 1.

4. The coating composition according to claim 3, further comprising a photoinitiator.

5. A method of coating a substrate, comprising applying the coating composition according to claim 3 to a substrate and curing the coating composition by means of UV radiation.

6. A coated article comprising a substrate coated with the coating composition according to claim 3.

7. The article according to claim 6, wherein the substrate is formed from a material selected from the group consisting of polycarbonate acrylonitrile butadiene styrene (PC/ABS), polycarbonate, polyacrylate, polyolefin, polyamide, polystyrene, glass, wood, aluminium, and aluminium alloys.

* * * * *